United States Patent [19]

Wirt

[11] E Re. 31,275

[45] Reissued Jun. 14, 1983

[54] ZENO DUCT SOUND ATTENUATING MEANS

[75] Inventor: Leslie S. Wirt, Newhall, Calif.

[73] Assignee: Lockheed Corporation, Burbank, Calif.

[21] Appl. No.: 266,715

[22] Filed: May 26, 1981

Related U.S. Patent Documents

Reissue of:

[64] Patent No.: 4,109,750
Issued: Aug. 29, 1978
Appl. No.: 799,953
Filed: May 24, 1977

[51] Int. Cl.[3] ..... F01N 1/04

[52] U.S. Cl. ..... 181/224; 181/248; 181/252

[58] Field of Search ..... 181/213, 214, 224, 247, 181/248, 252, 264, 222

[56] References Cited

U.S. PATENT DOCUMENTS 3,511,336 5/1970 Rink et al. ..... 181/224
3,542,152 11/1970 Adamson et al. ..... 181/214
3,685,611 8/1972 Duvvuri ..... 181/213
3,905,445 9/1975 Scharkon ..... 181/213

FOREIGN PATENT DOCUMENTS 744196 2/1956 United Kingdom ..... 181/213

*Primary Examiner*—L. T. Hix
*Assistant Examiner*—Benjamin R. Fuller
*Attorney, Agent, or Firm*—Frederic P. Smith

[57] ABSTRACT

A broadband sound attenuating, acoustically lined, duct of varying cross-sectional shape but in the usual case having a constant cross-sectional area, and wherein the duct liner is configured to maintain an essentially constant acoustic resistance and scaled acoustic reactance throughout provided by means of changes in the effective depth of the liner. Design tradeoffs permit some variation in the cross-sectional area of the duct with concomitant changes in liner properties. In all cases, the duct is designed so that every section along its major axis is optimally tuned to absorb most efficiently some part of the frequency spectrum of interest. The device is particularly suitable for sound suppression of jet aircraft engines.

22 Claims, 9 Drawing Figures

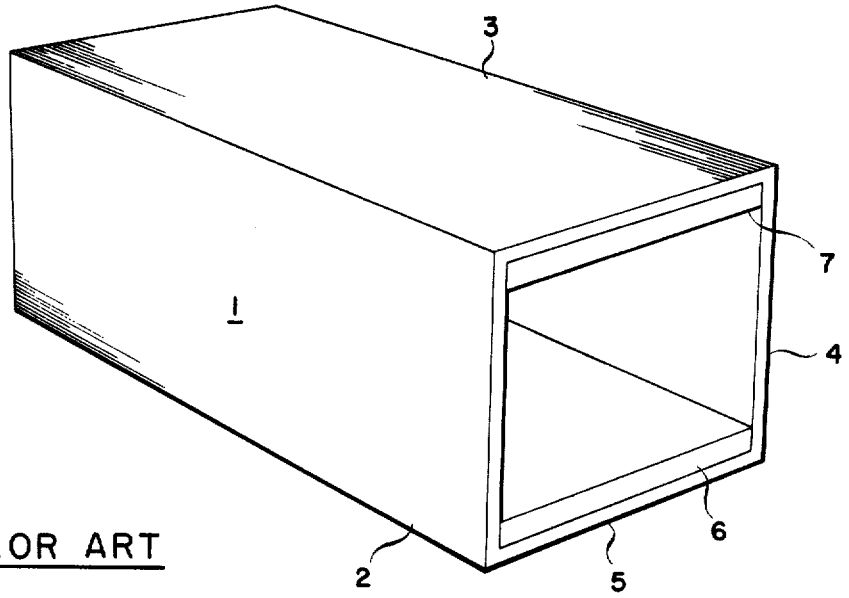
FIG. 1 PRIOR ART
FIG. 3
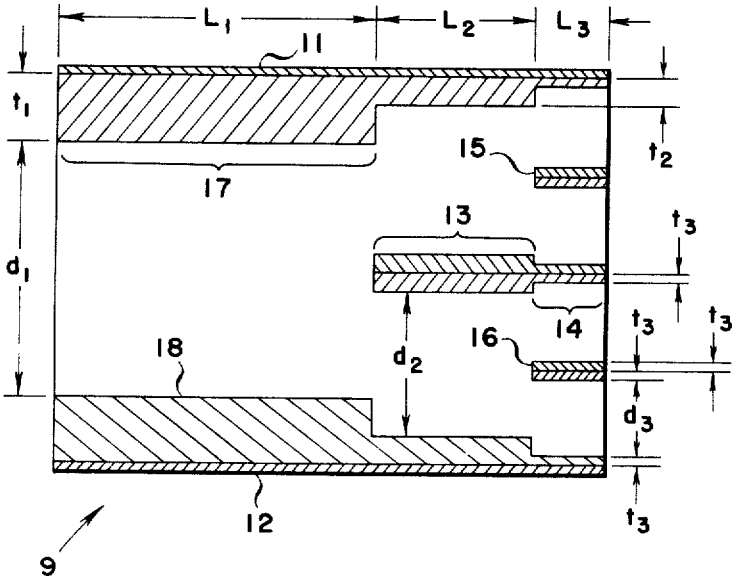

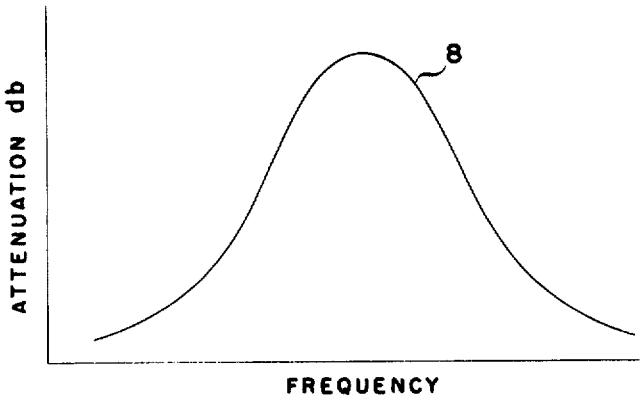
FIG. 2
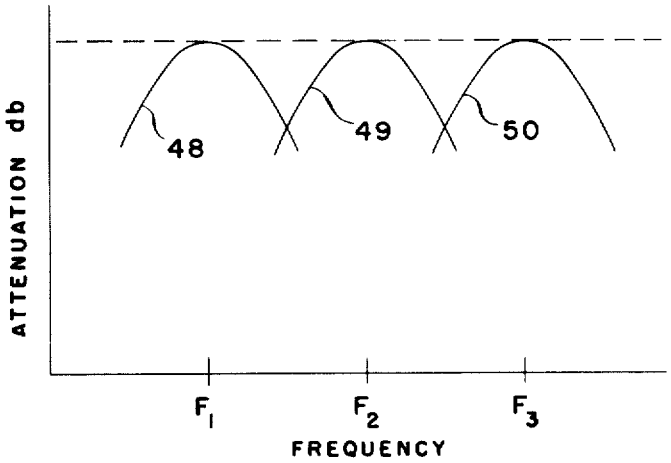
FIG. 4
FIG. 9
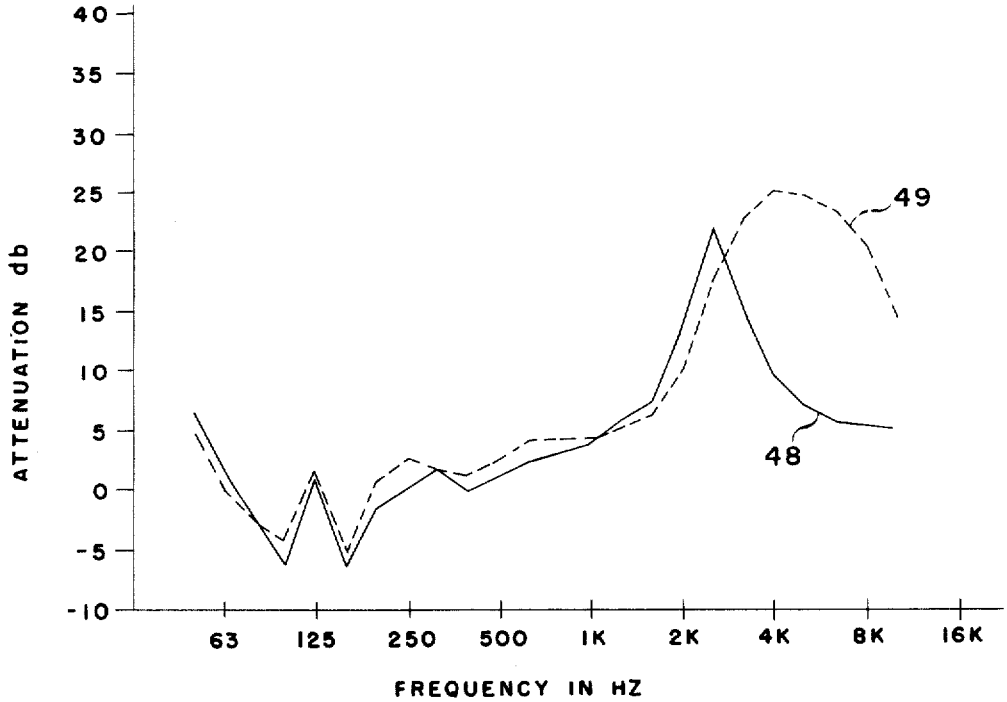

ZENO DUCT SOUND ATTENUATING MEANS

Matter enclosed in heavy brackets [ ] appears in the original patent but forms no part of this reissue specification; matter printed in italics indicates the additions made by reissue.

BACKGROUND OF THE INVENTION

Various means have been proposed heretofore for reducing and suppressing the noise in the exhaust duct of turbine engines, air conditioning duct systems, and similar equipment. The most common sound absorption technique of the prior art is the use of an absorptive lining within the duct as shown, for example, in U.S. Pat. No. 3,542,152, granted to Arthur P. Adams et al. It is also well known in the art to reduce the noise generated by appurtenances coming into contact with the air stream, such as flow splitters, guide vanes, fan blading, and the like, by reducing the wake emanating thereby through the utilization of boundary layer control. A prior art reference disclosing this approach is the literature publication, "Quiet Engine Nacelle Design," M. Dean Nelson, NASA SP-311, Aircraft Engine Noise Reduction, 1972. Other flow-duct noise abating means are shown in U.S. Pat. No. 3,503,495 to Kobayashi et al, U.S. Pat. No. 3,511,336 to Rink et al, U.S. Pat. No. 3,820,638 to Hanson. Still another approach to noise reduction is that suggested in U.S. Pat. No. 3,033,494 to Tyler et al, wherein noise reduction of jet engine exhaust may be provided by means of shaping the jet engine exhaust duct. The use of wedge-shaped bodies for the dissipation of high frequency vibratory energy is disclosed in U.S. Pat. No. 3,058,015 to Nesh.

A practical limitation of all of the aforementioned prior art devices is the limited frequency spectrum over which they can effectively function. There exists a need for a broadband sound absorber of comparable efficiency. Classical acoustic theory indicates that for any given duct there is a given acoustic impedance spectrum of the duct liner which would provide the best possible attenuation at all frequencies. However, there are no known practical materials capable of providing an acoustic impedance which is the optimum function of frequency. Resistance which increases with frequency has been attained, but a reactance which becomes more negative as the frequency increases has not been attained in any practical way. Thus, the attenuation attained in real ducts falls far short of theoretically attainable values, except for a single frequency.

SUMMARY OF THE INVENTION

The present invention relates to an acousticallly lined duct designed so that acoustical resistance and scaled reactance remain essentially constant along the major axis or flow passage of the duct. One way in which this may be achieved is by varying the cross-sectional geometry without varying the cross-sectional area. This design approach may be embodied in various ways including a tapering duct construction, a fluted or cruciform construction, or an annular construction with splitter vanes of progressively changing dimensions therein. The acoustical lining material for certain of the walls of such ducts is designed to present varying thickness or gradually taper so as to assist in maintaining cross-sectional area equivalencies, and at the same time be capable of handling a broad range of noise frequencies. Inasmuch as there is no reduction in the cross-sectional area of the duct along its major axis, there is no significant flow penalty.

BRIEF DESCRIPTION OF THE DRAWINGS

FIG. 1 is a perspective view of a conventional (prior art) square cross-sectional flow duct, useful in the exposition of the invention;

FIG. 2 is a chart illustrating the performance of the apparatus of FIG. 1 wherein sound attenuation is plotted as a function of frequency;

FIG. 3 is a cross-sectional elevation view of a first embodiment of the invention;

FIG. 4 is a chart graphically illustrating the performance of the apparatus of FIG. 3 wherein sound attenuation is plotted as a function of frequency;

FIG. 9 is a chart graphically comparing the performance of the present invention with that of a typical prior art device, wherein attenuation is plotted as a function of frequency.

DESCRIPTION OF THE PREFERRED EMBODIMENTS

Figure 5:
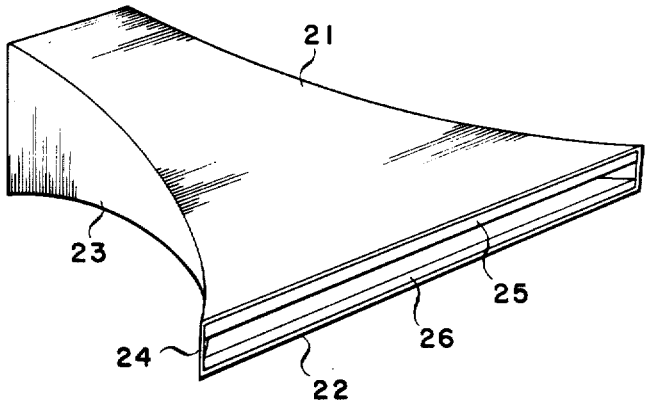
FIG. 5 is a perspective view of a second embodiment of the invention which is square at one end and rectangular at the other.

While the invention is particularly applicable for use in turbine engine exhaust ducts, it is to be understood that the device has applications in many other kinds of sound-generating apparatus, particularly where the source of sound is in communication with a fluid stream. The fluid stream may be either gas or liquid, since the applicable physical laws apply equally for either fluid. Typical examples of such applications are to be found in air conditioning ducts, turbine inlets, ducted fans, and the like. There is shown in FIG. 1 a section of a simple rectangular duct 1, comprising side walls 2–5, constructed of any suitable and well known material. The duct 1 has a uniform cross-sectional geometry, generally of rectangular or square configuration. The duct 1 may be lined on one or more of its interior walls with a sound absorptive liner such as indicated at 6 and 7. The liner may comprise a resistive facing sheet over a compartmented air space, or acoustical foam, or other suitable material. The active or working areas of the duct are those so treated with the resistive material. It is well known that an acoustically lined duct, such as that shown in FIG. 1, produces an attenuation spectrum, for sounds propagated along the major axis thereof, which first rises with increasing frequency, attains a maximum, and then declines in value in a manner which resembles a resonance curve. Such a curve is indicated at 8 in FIG. 2.

The value of the peak attenuation and the frequency at which it occurs are a function of the duct width between the confronting liners 6 and 7, (d), the duct length, (L), and the acoustic impedance of the duct liner, ($Z=R+JX$), plus some additional complications if flow is present.

Neglecting flow, the greatest attenuation occurs at each frequency provided the resistance and reactance are a particular function of the frequency.

$R=0.91$ (df/c) pc rayls $X=-0.77$ (df/c) pc rayls where p=density of the sound transmitting medium and c=the speed of sound in the medium. The centimeter-gram-second (cgs) unit of acoustic resistance is called the rayl.

Thus, for any given duct, there is a particular Z (f) which would provide the best possible attenuation at all frequencies. However, this optimum attenuation also shows a distinct peak near the frequency f for which the duct width d is one wave length $\lambda$ and the available attenuation rolls off at about 6 decibels (dB) per octave at higher frequencies. There are no known prior art duct lining materials capable of providing an acoustic impedance which is the optimum function of frequency. Although a resistance which increases with frequency is obtainable in practical materials, a reactance which becomes more negative as frequency increases has not heretofore been attained in any practical way. It is for this reason that the attenuation attained in ducts of the type shown in FIG. 1 falls far short of theoretically obtainable values except that it may be attained at a single frequency by careful design of the materials to provide optimum R and X at that frequency.

The greatest attenuation peak is attained if this design frequency is that for which $d=\lambda$ with $R=0.91$ pc, $X=-0.77$ pc.

It should be noted that these conditions for optimum attenuation are scalable; for example, if a first duct is made with d=30 centimeters (cm), $R=0.91$ pc, $X=[0.77]-0.77$ pc at 1100 hertz (Hz) and 120 cm long, and a second duct with d=15 cm, $R=0.91$ pc and $X=[0\ 0.77]-0.77$ pc at 2200 Hz, 60 cm long, the ducts will provide the same optimum value of attenuation at 1100 and 2200 Hz, respectively, and similarly also for any other scaling factor. Note that R remains constant, and that the reactance has also remained constant because the product df remains constant. For most materials, this means that the thickness of the liner material has been halved as the duct width d was halved. Advantage of this property is taken by the present invention to obtain attenuation closely approaching the theoretical optimum at all frequencies of interest.

There is shown in FIG. 3 a first embodiment of the invention comprising a flow duct 9 bounded by walls 11 and 12 on one side, and a pair of confronting orthogonal walls (not shown) on the other side. Thus, the cross-sectional configuration is rectangular. The interior of the duct is provided with a central flow splitter 13, a pair of intermediate flow splitters 15 and 16, and confronting wall liners 17 and 18. The flow splitters 13–15, and wall liners 17 and 18 are fabricated from a sound absorptive material, such as acoustical foam. Assume that the first section of the duct, along its major axis, has a length $L_1$ and has an effective internal width $d_1$, and provides optimum attenuation $A_1$ at frequency $f_1$ with a liner having a thickness $t_1$. Further assume that the next section of the duct has a length $L_2$ which equals $\frac{1}{2}L_1$ and is provided with a single splitter 13 having a half thickness $t_2$ which equals $\frac{1}{2}t_1$. Also assume that the next section of the duct $L_3$ has a length which equals $\frac{1}{2}L_2$ and $\frac{1}{4}L_1$, and is provided with three flow splitters of sound absorptive material, each having a half thickness $t_3$; the half thickness $t_3$ of the absorptive splitter equals $\frac{1}{2}t_2$, $=\frac{1}{4}t_1$, etc.

Because the thickness t scales to thinner values, both the exterior size of the duct and the cross-section available to flow remain constant. Optimum attenuation $A_1=A_2=A_3=A_n$ is provided at $f_1$, $f_2$, $f_n$ for as many sections as are provided. The attenuation of the three-section duct absorber of FIG. 3 is shown by curves 48–50 in FIG. 4. The total length, however, never attains $2L_1$ because $L=L_1+\frac{1}{2}L_1+\frac{1}{2}^{n-1}L_1<2L_1$ for finite n. The design provides essentially constant optimum attenuation from $f_1$ to $f_n$. If the desired attenuation varies as a function of frequency, the lengths $L_1 \ldots L_n$ may be varied accordingly.

In the foregoing discussion it has been assumed that there is no flow within the duct. However, it is recognized that in certain practical cases there will be flow within the duct and such action may be conveniently specified by means of a local Mach number (M). It should be noted that M is positive if flow through the duct and sound travel in the same direction, but M is taken negative if flow opposes the sound direction. If the effects of flow are included, the optimum wall impedance is:

$$Z_{optimum} = 1.2\,\frac{d}{\lambda}\,e^{-J0.7}\,\frac{1}{(1+M)^2} = R_{opt} + JX_{opt}$$

or $$R_{opt} = .91\,\frac{df}{c}\,\frac{1}{(1+M)^2}$$

$$X_{opt} = -.77\,\frac{df}{c}\,\frac{1}{(1+M)^2}$$

where $\lambda$=wavelength

M=Mach number of the flow in the duct

If the flow cross-sectional area of the duct is held constant then $$\frac{1}{(1+M)^2} = \text{constant} = B$$

$$R_{opt} = .91B\,\frac{d}{\lambda} = .91B\,\frac{df}{c}$$

$$X_{opt} = -.77B\,\frac{d}{\lambda} = -.77B\,\frac{df}{c}$$

Assume that at one end of the duct, which, for example, may be the entrance, the width is $d_o$ and the lowest frequency for which large attenuation is needed is $f_o$ then one may solve for $R_{opt}$ and $X_{opt}$ and design a lining to provide this value of impedance at frequency $f_o$. Now, freeze the numerical value of both $R_{opt}$ and $X_{opt}$, call then $R_o$ and $X_o$.

In the case of an embodiment of the invention built with splitters, as one passes from the first section having width $d_o$ the passage abruptly narrows to width $\frac{1}{2}d_o$. It follows that for frequency $2f_o$:

$$R_{opt}=R_o$$

$$X_{opt}=X_o$$

and all conditions are still optimum for absorption of frequency $2f_o$ into the splitters. This process may be continued as often as desired.

In the case of a continuously tapering duct the same argument applies. A fixed value of $R=R_o$ and $X=X_o$ is optimum at any frequency such that the product df is constant:

$$df = d_o f_o$$

It is to be understood that:

$R = R_o$ a constant at any frequency f $X = X_o$ where X is reckoned at frequency f at the point in the duct where the duct width is d.

The manner in which this scaling is accomplished depends upon the type of lining or sound absorptive treatment. Consider first a resistive facing sheet over a compartmented air space.

For a linear facing sheet:

R = constant independent of frequency. Select a facing so that $R = R_o$

For an air space:

$$X = -\cot \frac{2\pi f}{c} t$$

where t is the depth of the airspace.

Thus, simply vary t along the duct such that $$ft = f_o t_o$$

where $t_o$ had been originally selected such that:

$$X_{opt} = X_o = -\cot \frac{2\pi f_o}{c} t_o$$

$$= -.77B \frac{d_o f_o}{c}$$

Even though the flow cross-section of the apparatus of FIG. 3 does not vary along the major axis of the duct, for certain aerodynamic considerations the use of flow splitters 13–16 may be objectionable. Accordingly, there is shown in FIG. 5 a functionally equivalent embodiment of the invention in which no flow splitters are present. This embodiment comprises upper and lower walls 21 and 22, respectively, and side wals 23 and 24. The width of walls 21 and 22 continuously increases from one end to the other, while the width of walls 23 and 24 decreases from one end to the other as viewed in the same direction. These complementary tapers of the orthogonally disposed walls result in a duct geometry in which one end has a square cross-section and the other end has an elongate rectangular cross-section. The taper or flare of the walls is selected to hold the internal cross-section area constant. The interior surfaces of walls 21 and 22 are faced with absorptive linings 25 and 26, respectively. It is to be understood that the linings 25 and 26 may comprise any suitable sound absorptive treatment. The height between treated surfaces d decreases and the width w increases at the rate necessary to hold the cross-section area constant. The acoustic resistance R of the lining (25, 26) is held constant near 0.91 pc and the thickness t is varied to keep $X = -0.77$ pc. In other words, usually t/d = constant. This configuration is the functional equivalent of that of the previously described embodiment shown in FIG. 3.

Figure 6:
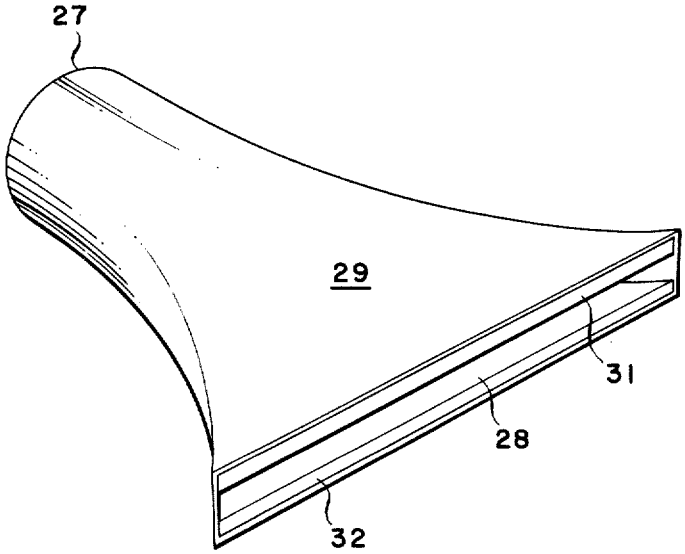
FIG. 6 is a perspective view of a third embodiment of the invention wherein one end of the duct is circular and the other end is rectangular.

There is shown in FIG. 6 still another embodiment of the invention in which the first end of the duct, which may be either the inlet or the outlet, has a circular cross-sectional geometry and the other end of the duct 28 has an elongate rectangular cross-section geometry. The duct 29 is provided with an absorptive interior wall treatment 31–32.

The design procedure used to obtain the construction shown in FIGS. 3, 5 and 6 is to design a series of constant cross-section units of lengths $L_1$, $L_2$, $L_3$, etc. to provide the desired values of $A_1$, $A_2$ . . . $A_n$. In the embodiments of FIGS. 5 and 6, the discontinuous sections ($L_1$ . . . $L_n$) are smoothed into the continuously varying shape. In this way, any desired attenuation spectrum can be obtained in an optimum way by a minimum length duct.

The essence of the invention is a sound attenuating acoustically lined duct of axially varying cross-section geometry, the liner or interior acoustic treatment being so chosen that the acoustic resistance R remains essentially constant and the ratio of effective depth to the distance of the treated surfaces t/d remains essentially constant. Resistance is always kept invarient while scaling, and all dimensions L, d, etc., are inverse to frequency. Further embodiments of this invention may take the form shown in FIGS. 7 and 8.

Figure 7:
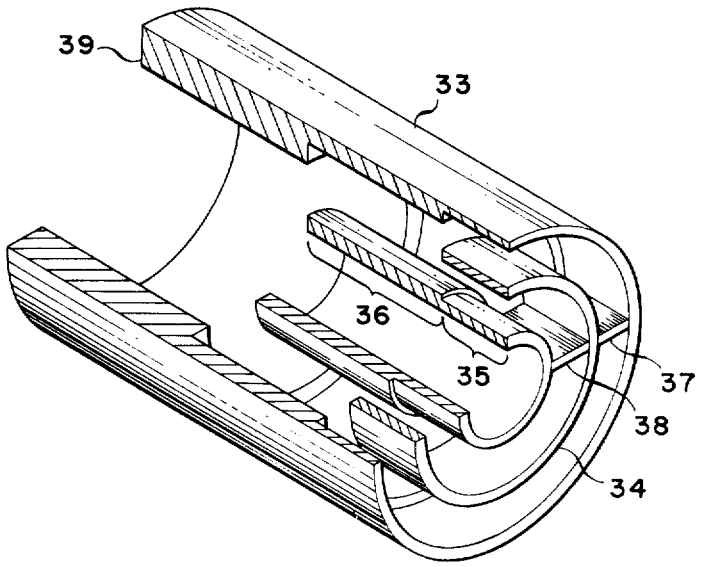
FIG. 7 is a perspective view, partially in section, illustrating a modification of the embodiment of the apparatus described in connection with FIG. 3.

Referring to FIG. 7 there is shown a flow duct 33 of circular cross-section of uniform external dimension along its major axis. Circular splitters 34, 35 and 36 of cylindrical shape, are coaxially disposed within the duct 33 and carried by spiders 37 and 38, or any other suitable support means. The interior wall of duct 33 is provided with a sound absorptive treatment 39 which varies in thickness along its length in conformance with the opposing splitters (34–36).

Figure 8:
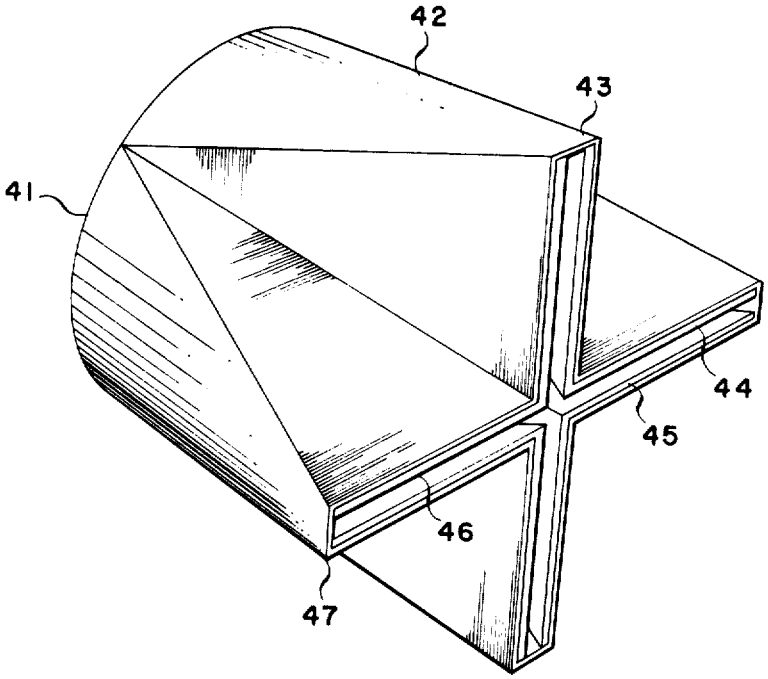
FIG. 8 is another embodiment of the invention having a circular opening at one end and a cruciform opening at the other.

There is shown in FIG. 8 an embodiment of the invention in which the first end 41 of the duct 42 is of circular cross-section, and the other end 43 is of cruciform cross-section. The interior walls are lined with acoustic treatment 44 and 45 having a thickness which varies along the major axis of the duct 42. That is, the thickness of liner 44, for example, will be greater at end 41 than at end 43.

There is shown in FIG. 9 actual measurements of the attenuation of a sound absorber constructed in accordance with the invention as compared with the sound absorption of a square duct such as that shown in FIG. 1. As can be seen in FIG. 9, frequency in hertz is plotted along the abscissa and attenuation in decibels is plotted along the ordinate. The attenuation as a function of frequency for the apparatus of FIG. 1 is shown by curve 48. Similarly, the attenuation as a function of frequency obtained from the present invention as constructed in accordance with FIG. 5, is shown by curve 49. Both ducts from which these data were obtained are 46 cm long and have a constant inside cross-sectional area of 232 $cm^2$. The apparatus constructed in accordance with FIG. 1 is lined on two sides with a commercial sound absorptive material, called "Scottfelt," 1.2 cm thick with its density adjusted so that its throughflow resistance is about 1 pc. The duct constructed in accordance with the embodiment of FIG. 5 has an interior cross-section which varies smoothly from a 15×15 cm square at one end to a 3.8×58.5 cm rectangle at the other end. Two opposing interior side walls are treated with Scottfelt. The Scottfelt varies from 1.27 cm at the square end to 0.32 cm at the rectangular end such that the thickness is always in the same proportion to the local duct height. The density of the Scottfelt is adjusted such that the local throughflow resistance is maintained at 1 pc.

The attenuation of the two ducts was measured on a side by side comparison basis and the results are shown in the graph of FIG. 9. The attenuation spectrum of the control duct, FIG. 1, is exactly that which would be expected from classical square duct theory, a 22 dB peak at 2500 Hz dropping rapidly and smoothly to 5 dB at 10 KHz. The attenuation of the duct constructed as shown in FIG. 5 is also exactly as expected, 18 dB at 2500 Hz rising to a very broad peak of 25 dB at 4 KHz and still showing 15 dB at 10 KHz. This broad peak or hump in the curve can be shifted downward in frequency by at least two octaves by use of thicker absorptive lining material. It will be seen from the FIG. 9 graph that substantial noise reduction over an extended frequency spectrum is obtained by the apparatus of the present invention.

In summary, the invention may be described as follows: A lined duct having a plurality of different duct widths such as $d_o$, $d_i$ the liners being scaled to provide substantially the same values of acoustic resistance and acoustic reactance at different frequencies, such as $f_o f_1$ where $$d_1 f_1 = d_o f_o$$

In the most general case, the cross-sectional area need not remain constant. If the cross-section area varies, the Mach number will vary.

$$R_{opt} = .91 \frac{df}{c} \frac{1}{(1+M)^2}$$

$$X_{opt} = -.77 \frac{df}{c} \frac{1}{(1+M)^2} \left[ X_{opt} = .77 \frac{df}{c} \frac{1}{(1+M)^2} \right]$$

Note that the ratio of $R_{opt}$ to $X_{opt}$ is always the same at any point in the duct and freuency f regardless of the local Mach number.

Then instead of holding R constant adjust R as follows:

$$\frac{R_1}{R_o} = \frac{d_1 f_1}{d_o f_o} \frac{(1+M_o)^2}{(1+M_1)^2}$$

Similarly, adjust X along the duct such that $$\frac{X_1}{X_o} = \frac{d_1 f_1}{d_o f_o} \frac{(1+M_o)^2}{(1+M_1)^2}$$

In this way, an optimum broadband lined diffuser can be designed. This is the most general case.

Other duct geometries are more difficult to analyze formally. For example, the exact scaling process for a round to [alliptical] *elliptical* or round to oval or round to rectangular duct is beyond such easy analysis, however, the analysis of the equivalent square duct will always be approximately correct if the value for equivalent d is judiciously chosen. For example, let d = minor axis of an ellipse or the width of an oval. The object of such approximations is the same, a duct every section of which is optimally tuned to absorb most efficiently some part of the frequency spectrum of interest. Many practical embodiments of the inventions, in addition to those specifically shown and described herein, may be made by those versed in the art by following the teaching herein.

What is claimed is:

1. A sound attenuating duct operable over a frequency band spanning a given intermediate frequency, comprising:

boundary means defining a liquid passage having a substantially uniform cross-sectional area of the flow path therethrough, and further having a first dimension transverse of the flow path at a first location, which first dimension is that which provides optimum sound attenuation at said given intermediate frequency, and having second and third dimensions transverse of the flow path at respective second and third locations spaced apart from said first location, said second and third dimensions differing from said first dimension so as to provide effective sound attenuation over said absorption band; and, sound absorbing liner means on at least a portion of an interior wall of said boundary means at said first, second, and third locations, said liner means having an essentially constant acoustic resistance over said absorption band, and the ratio of the effective depth of said liner means at each of said locations to their respective transverse duct dimensions, being substantially constant.

2. A sound attenuating duct as defined in claim 1 including:

a plurality of sound absorptive splitters each of which is located at a respective one of said second and third locations.

3. A sound attenuating duct as defined in claim 1 wherein the interior cross-sectional shape of said duct varies continuously between said locations.

4. A sound attenuating duct as defined in claim 3 wherein the cross-sectional shape of said duct is square at one end thereof and elongate rectangular at the other end thereof.

5. A sound attenuating duct as defined in claim 3 wherein the cross-sectional shape of said duct is circular at one end thereof and rectangular at the other end thereof.

6. A sound attenuating duct as defined in claim 3 wherein the cross-sectional shape of said duct is fluted at one end thereof, and rectangular at the other end thereof.

7. A sound attenuating duct as defined in claim 3 wherein the cross-sectional shape of said duct is circular at one end thereof and fluted at the other end thereof.

8. A sound attenuating duct as defined in claim 3 wherein the cross-sectional shape of said duct is circular at one end thereof and oval at the other end thereof.

9. A sound attenuating duct as defined in claim 1 wherein said boundary means comprises a conduit, and wherein said second location is upstream of said first location and said third location is downstream of said first location.

10. A sound attenuating duct as defined in claim 9 wherein the dimension of said conduit normal to said first dimension remains substantially constant throughout said flow path.

11. A sound attenuating duct as defined in claim 10 wherein the thickness of said liner means varies substantially uniformly throughout said flow path.

12. A sound attenuating duct as defined in claim 1 wherein said liner means comprises a resistive facing sheet over a compartmented air space.

13. A sound attenuating duct as defined in claim 1 wherein said liner means comprises an acoustically resistive foam material.

14. A sound attenuating duct as defined in claim 1 wherein said liner means comprises a fibrous sound absorber material.

15. A sound attenuating duct comprising:

means defining an elongate flow passage of substantially uniform cross-sectional area throughout and a lesser transverse dimension d which varies along the length of said flow passage; and, sound absorptive means located within said passage defining means, and wherein the acoustical resistance of said absorptive means measured in rayls equals approximately 0.9 (df/c) pc, and the acoustical reactance X of said duct measured in rayls equals approximately −0.8 (df/c) pc, *and the product df is kept essentially constant,* where d equals the lesser transverse dimension of said flow passage, f equals the frequency of local maximum attenuation, c equals the speed of sound in the medium within the duct, and p equals the density of said medium, whereby R and X remain essentially constant throughout the length of said flow passage.

16. A sound attenuating duct as defined in claim 15 wherein said dimension d varies smoothly along the length of said duct.

17. A sound attenuating duct as defined in claim 15 wherein said dimension d has at least three discrete values.

18. A sound attenuating duct comprising:

means defining an elongate flow passage having a transverse dimension d which varies along the length of said flow passage;

sound absorptive means located within said passage defining means, and wherein the acoustical resistance of said absorptive means measured in rayls equals approximately 0.9 (df/c) [pc] $pc/(1+M)^2$, and the acoustical reactance X of said duct measured in rayls equals approximately −0.8 (df/c) [pc] $pc/(1+M)^2$ *and the product* $df/(1+M)^2$ *is kept essentially constant,* where d equals the transverse dimension of said flow passage, f equals the frequency of local maximum attenuation, c equals the speed of sound in the medium within the duct, [and] p equals the density of said medium, *and M is the Mach number of flow in said flow passage,* whereby R and X remain essentially constant throughout the length of said flow passage;

fluid flows through said passage at a local flow Mach number $M_0$ at a first location in said passage and at a local flow Mach number $M_1$ at a second location whichis displaced along said passage from said first location, and wherein said sound absorptive means has a finite local acoustic impedance $Z_0$ the value of which at said first location, and at a first given frequency $f_0$, is determined by the effective transverse dimension of said passage $d_0$; and, at said second location having an effective transverse dimension $d_1$, where $d_1 \neq d_0$, the local acoustic impedance $Z_1$ is made to equal $Z_0$, at a second given frequency $f_1$, where $f_0 \neq f_1$, by maintaining the following relationship:

$$\frac{f_1}{f_o} = \frac{d_o}{d_1} \cdot \frac{(1 + M_1)^2}{(1 + M_o)^2}.$$

19. A sound attenuating duct as defined in claim 18 wherein:

$M_0 = M_1$ whereby $f_1/f_0 = d_0/d_1$.

20. A sound attenuating duct as defined in claim 18 wherein the effective transverse dimension varies continuously and smoothly between said first and second locations.

21. A sound attenuating duct for the conduction of fluid flow therethrough, comprising:

an axially extending passageway, said passageway being variable in cross-sectional shape due to a variation in flow passsage width, but remaining substantially constant in cross-sectional area; and, a sound absorptive liner within at least a portion of said passageway and having variable acoustical properties such that the normalized acoustical impedance thereof, as a function of the wavelength of sound, expressed as $Z(\lambda)/pc$, remains essentially constant along said duct when determined at a frequency for which $\lambda = d$, where Z is acoustical impedance, $\lambda$ is the wavelength of sound, p is the density of the medium within the duct, c is the speed of sound in the medium, and d is the width of the flow passage.

22. A sound attenuating duct as defined in claim 21 wherein:

$$\frac{Z(\lambda)}{\rho c} = \frac{R(\lambda)}{\rho c} + \frac{jX(\lambda)}{\rho c}$$

wherein $R(\lambda)/pc$ is of the order of unity and $X(\lambda)/pc$ is of the order of negative unity.

* * * * *